United States Patent [19]

Haas

[11] Patent Number: 4,580,962

[45] Date of Patent: Apr. 8, 1986

[54] SEAL MOLD AND METHOD

[75] Inventor: Norman C. Haas, Wheaton, Ill.

[73] Assignee: Chicago Rawhide Mfg. Co., Elgin, Ill.

[21] Appl. No.: 622,559

[22] Filed: Jun. 20, 1984

[51] Int. Cl.$^4$ .................. B29C 33/14; B29C 45/14
[52] U.S. Cl. ................................. 425/111; 29/527.4;
264/276; 425/125; 425/544; 425/DIG. 5;
425/DIG. 47
[58] Field of Search .............. 425/110, 125, 127, 544,
425/DIG. 47, 121, 390, 330, 395, DIG. 5, 111;
264/262, 266, 268, 276; 29/527.4; 249/146

[56] References Cited

U.S. PATENT DOCUMENTS

| | | | |
|---|---|---|---|
| 2,891,283 | 6/1959 | Cramer et al. | 425/DIG. 5 |
| 3,090,996 | 5/1963 | Reichenbach et al. | 264/266 |
| 3,276,115 | 10/1966 | Hansz | 264/268 |
| 3,330,006 | 7/1967 | Jenkins | 425/DIG. 5 |
| 3,851,037 | 11/1974 | Day et al. | 264/268 |
| 3,875,654 | 4/1975 | Ushijima | 425/DIG. 47 |
| 3,930,780 | 1/1976 | Lovejoy | 425/DIG. 5 |

Primary Examiner—Jay H. Woo
Assistant Examiner—James C. Housel
Attorney, Agent, or Firm—James T. FitzGibbon; Angelo J. Bufalino

[57] ABSTRACT

A multipart mold assembly for removably receiving a casing unit and positioning the casing so as to form, in combination with at least one of the mold parts, a cavity having the shape of an element to be formed in the mold and bonded to the casing. One mold part has a surface defining part of the shape of said cavity, and a casing skirt support surface forms another part of the cavity. A flash barrier is formed along a part of the skirt casing when a clamping ring formed from a plurality of individual clamping ring elements engages the surface of said casing skirt and urges it into fluid-tight relation with the casing support surface.

12 Claims, 6 Drawing Figures

FIG-3

FIG-2 ial on tongue-like-portions of the

SEAL MOLD AND METHOD

BACKGROUND AND SUMMARY OF THE INVENTION

The present invention relates generally to fluid seals and apparatus and methods for making them. More particularly, the invention relates to molds adapted to receive and position a rigid seal casing element, normally an annular unit made from metal, and adapted to form contoured annular rubber sections lying along and having at least one surface bonded to such casing, while confining the elastomer to a carefully predetermined area. More specifically, the invention relates to molds having relatively movable elements adapted to embrace a skirt or like portion of an annular stamping element and compress it against an associated but slightly spaced apart counterpart or cooperating mold surface for the purpose of forming a "flash barrier", that is, a barrier against leakage or uncontrolled flow of fluent elastomer which is being formed and then cured in the mold.

With the increasing popularity of so-called "unitized" shaft seals, there has been an increasing need for improved manufacturing methods. By "unitized" as used herein is meant a seal unit wherein two or more relatively movable units, which when combined form a rotary seal, are manufactured, assembled and sold so that there is little or no opportunity for damaging exposure of the sealing surfaces on the seal body and the wear sleeve prior to receipt and installation by the customer. In this way, the manufacturer makes both the elastomeric or resinous sealing element and the associated or wear surface with which it will be engaged in use to form a seal and sells and delivers these units to the manufacturer who installs them on relatively movable parts having opposed cooperating surfaces forming parts of a sealed region.

One feature of such unitized seals is that, as one element, normally the so-called wear sleeve or companion flange is formed, a portion of one of the flanges is made of reduced thickness material to accommodate a subsequent bending or curling operation without damage to the seal. Consequently, as the stamping or other casing element is made, it includes two angularly related flange elements, normally a radial and an axial flange, and at least one of these flanges in turn includes a skirt portion of reduced thickness. In other cases, the skirt thickness is the same as that of the remainder of the casing with the skirt being separated from the remainder of the axial flange by a groove or notch. In still other cases, while not a preferred construction, the skirt is of the same thickness and is merely an extension of the axial flange. In convenience, reference is usually made to the skirt as being of reduced thickness, but this will be understood to refer only to one preferred embodiment and not to constitute an essential feature of the invention.

According to the invention, radially movable parts of the mold engage one surface of this flange, preferably a radially outwardly directed surface thereof, and upon mold closing, move slightly radially inwardly to urge this skirt portion into snug relationship with a radially outwardly directed counterpart or cooperating surface of the mold core. Consequently, an edge or corner of the mold core may engage an opposite surface of the flange at or along its skirt, decreased or reduced thickness portion thereby, to form a secure or tight flash barrier.

The invention includes a mold having a core element, with a portion thereof including surfaces defining part of a mold cavity, a multipart, segmented element resembling a collet or the like surrounding a portion of the core, with each of its elements or segments and having a radially inwardly directed land adapted to engage the skirt, exterior cam surfaces, a cam actuating unit, and one or more additional movable or stationary portions of the mold adapted to define the mold cavity, to locate the casing material or the like. Preferably at least one of these parts includes an additional ridge or land adapted to form another flash barrier with another part of the casing in the closed position of the mold.

Accordingly, in view of the need for improved molding apparatus and method, it is an object of the present invention to provide a mold for manufacturing oil seals or like parts.

Another object of the invention is to provide an oil seal mold which is adapted to position a stamping adapted to have an annular formation of fluent rubber formed therearound and bonded thereto, and to confine the rubber to a predetermined area.

A further object of the invention is to provide a mold unit which includes a fixed core or like element defining a portion of another element for receiving and positioning the stamping, and at least one generally annular cam element adapted to be acted upon when the mold closes to urge a multipart or segmented ring inwardly so as to engage the stamping and urge it against an associated, oppositely directed mold part surface.

Another object of the invention is to provide a mold which is particularly adapted to deform metal temporarily and within its elastic limit for the purpose of forming a flash barrier, but not to deform such metal so as to render it difficult or impossible to remove from the mold after the elastomer is bonded thereof.

Still another object of the invention is to provide a mold apparatus which is able to use existing technology in large part but which can provide further advantages in use.

A still further object of the invention is to provide a mold which includes an annular mold clamping ring having at least one land or rib portion adapted to be compressed or expanded radially so as to elastically deform a portion of a metal casing therein, which ring is subdivided into plural parts and urged into a spaced apart position from the work to be engaged by an annular spring and which is adapted to be moved oppositely by a cam element, with the two parts having mutually engageable cam surfaces. Another object is to provide a mold which can conveniently provide both radial and axial barriers in the same unit.

Another object of the invention is to provide a method of forming an annular bead of elastomer and bonding it to a metal or like rigid casing which includes positioning a stamping having a portion exposed to and forming one surface of a mold cavity, engaging another part with a radially movable mold element so as to urge a portion of the casing snugly against a mold part lying just opposite the first part and separated therefrom by the thickness of the casing material, and closing the mold and forming a second flash barrier by engaging the spaced apart portion of the casing with a flash barrier land and while maintaining the rib in snug engagement with the stamping skirt, filling the mold with fluent rubber and permitting it to bond to the casing surface before releasing the encircling forces on the skirt, and then opening the mold for release of the completed product.

The foregoing and other objects of the invention are achieved in practice by providing a mold having a core section and a stamping support and positioning section which includes both radially immovable and movable parts, with the movable part including a skirt-engaging land portion and consisting of plural segments adapted to be urged radially by a cam action into engagement between the rib and the skirt, and means for holding the mold in the closed position while fluent rubber is forced into the mold cavity formed in part by mold element surfaces and in part by the casing received in the mold.

The invention also achieves its objects by providing a molding method which includes positioning a stamping having an axial flange with a marginal skirt portion and transiently radially deforming the skirt portion during the time a fluent elastomer is forced into bonding relation with another portion of the casing, maintaining the flash barrier until the elastomer has at least partially cured, and thereafter opening the mold to remove the finished part.

The exact manner in which the foregoing and other objects and advantages of the invention are achieved in practice will become more clearly apparent when reference is made to the following detailed description of the preferred embodiments of the invention set forth by way of example and shown in the accompanying drawings in which like reference numbers indicate corresponding parts throughout.

DESCRIPTION OF THE PREFERRED EMBODIMENTS OF THE PRESENT INVENTION

While it will be understood that the principles of the invention are applicable to molds which act radially outwardly as well as inwardly in the formation of flash barriers, and to molds having auxiliary axially acting flash barriers, a description of a preferred form of the invention will be made in which the flash barrier formed radially on the section of reduced thickness is formed by a radially inward movement sequence, with the lands being formed on mold segments which move radially inwardly upon the application of a camming force during mold closure.

It will be appreciated that the description shows using the mold to form a flash barrier on an auxiliary or companion flange member rather than a seal having a primary lip or a primary and second lip; however, it will be understood that the contours of the mold cavity per se do not form a part of the invention, and that the invention is not to be limited to molds wherein only a single annular bead is formed, but is equally applicable to molds which include cavities of more complexity, including those used to form primary radially acting seal lips or the like.

Figure 1:
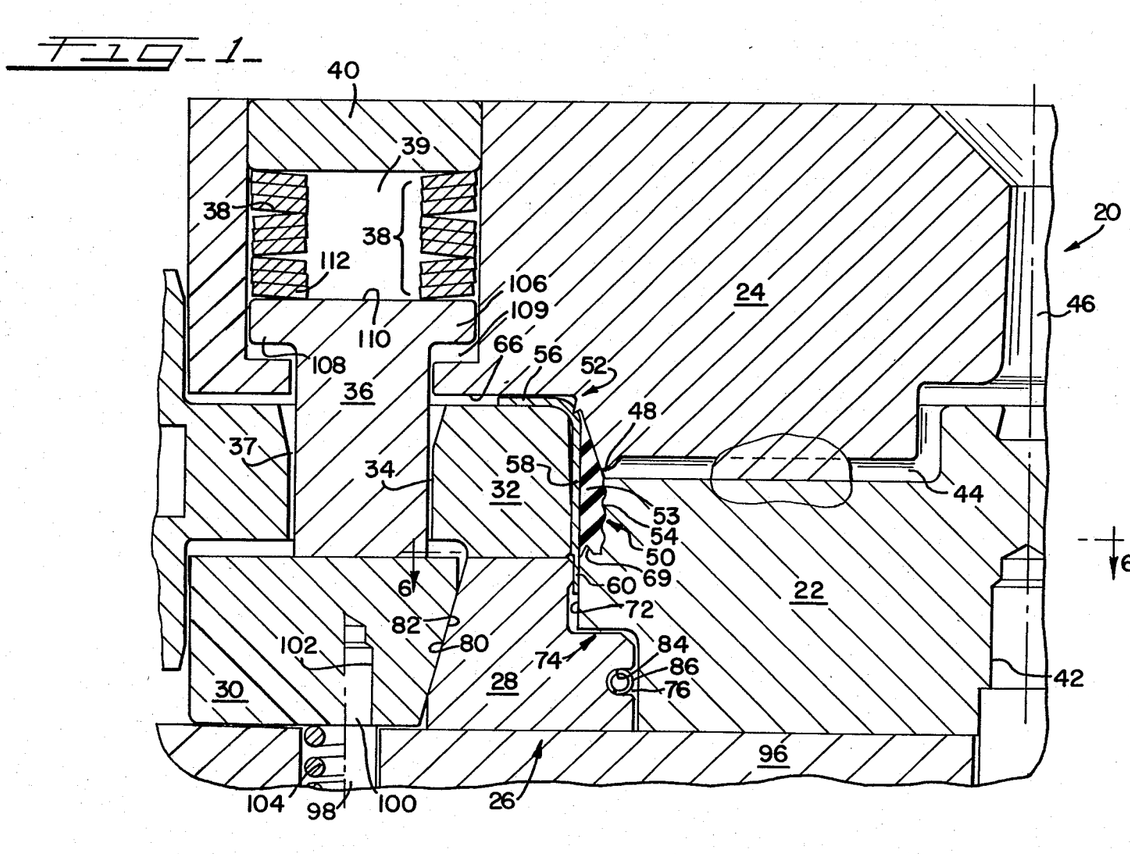
FIG. 1 is a vertical sectional view, with portions broken away, showing a preferred form of mold unit made according to the invention.

Referring now to the drawings in greater detail, FIG. 1 is a fragmentary vertical sectional view, with portions broken away, showing a multipart mold assembly of the invention generally designated 20 and shown to include a lower mold core 22, a separable upper or top mold core 24, a radially acting segmented clamping ring 26 formed of plural individual ring segments 28, a cam ring 30, a centering ring 32 with plural spaced apart guide bores 34, a cam actuating plunger 36 in each bore 34, a stack of plunger operating springs 38 located in a spring cavity 39, and a column unit 40 for engaging the spring stack 38.

The mold core 22 includes a shoulder bolt cavity 42, aiding in initial core alignment, means at least partially defining a passage or channel 44 extending from the central sprue 46 to the gate 48. The passage 44 receives fluent elastomeric material during the injection or compression stroke in a manner known to those skilled in the art, and directs this fluent, curable elastomer through the gate 48 at the end of the passage 44 into the seal forming cavity generally designated 50 (FIGS. 2 and 3), wherein the body or other element of the seal unit is formed.

The numeral 52 generally designates the seal or part thereof which is shown to include not only an elastomeric body 53 having radially inwardly directed ribs 54 for forming a snug seal over a shaft or like associated part, but also a casing generally designated 55 and shown to include a radial flange 56, and an axial flange 58, with the latter having a skirt portion 60 shown to be of reduced thickness in this illustration.

Figure 2:
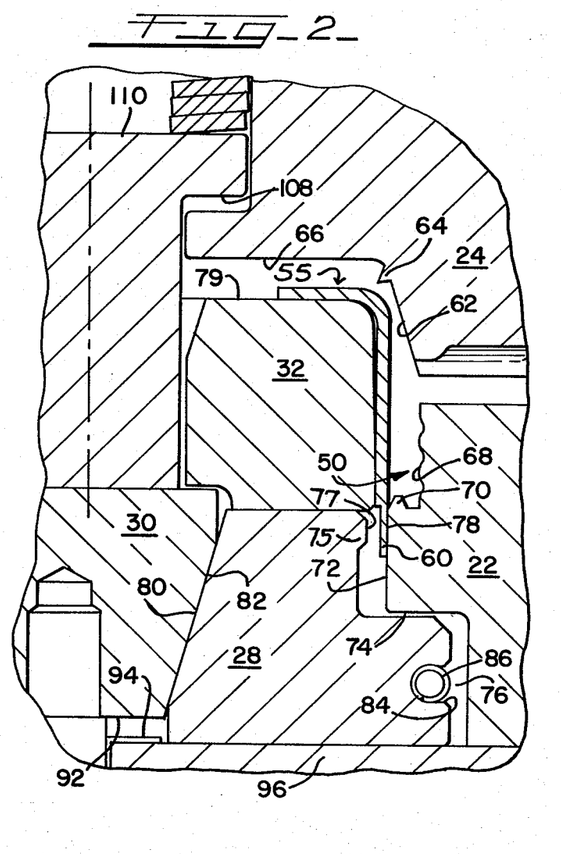
FIG. 2 is a vertical sectional view, on an enlarged scale, showing certain portions of the mold of FIG. 1, in the open position and with a seal casing received in place within the mold cavity.

Referring again to the other mold elements, the top core 24 includes means cooperating with the lower core 22 to form the passage 44 and gate 48 just referred to. In addition, and referring now to FIG. 2, for example, the upper core 24 includes a tapered circumferential surface 62 forming a part of the mold cavity 50 and a sharpened circumferential land 64, lying below a generally radially extending surface 66 which in the closed position of the mold, is spaced slightly apart from the surface 79 to accommodate variations in casing thickness. While small diameter elastomer passages 44 extend through the upper core 24 at the bottom thereof, most of the top of the core 22 has a continuous flat surface 24 (FIG. 3); the mold "shut height" is established by contact between the lower surface 25 of the upper core 24 and this upper surface 23 of the core 22. FIG. 2 also shows that the lower core 22 includes contoured, circumferentially extending, radially outwardly directed surfaces 68 forming the ribs 54 (FIG. 1) on the finished product 52. In addition to the contoured land 70 forming an axial end groove 69 in the body 53, it will be noted that the lower core 22 also includes a cylindrical skirt support surface 72 extending below the cavity 50, and terminating in a shoulder 74 to provide an annular working cavity 76 to accommodate movement of the mold segment 28, as will appear.

The skirt support surface 72 is adapted to have a portion thereof engaged in relatively snug, but not deforming relation with the radially inwardly directed surface 78 of the casing skirt 60. FIG. 2 also shows that the stamping or casing of the seal 52 is positioned by resting on the upper surface 79 of the centering ring 32, and that there are mutually opposed surfaces 80, 82 respectively on the segment 28 and the cam ring 30 which permit relatively free radial sliding movement of the segment 28 during mold operation.

Figure 6:
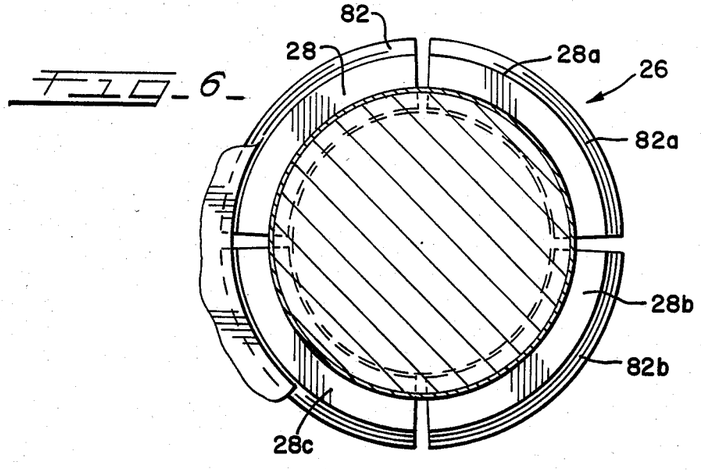
FIG. 6 is a horizontal sectional view, on a reduced scale, taken along lines 6—6 of FIG. 1 and showing the separable or collet type cam segments elements of the mold unit of the invention.

Referring again to the segment 28, it will be noted that this unit (and its counterparts shown in FIG. 6) includes a radially inwardly extending skirt-engaging land generally designated 75 and being defined by an engagement surface 77, joined at its edges to a pair of tapered or beveled offsetting surfaces 79. Each segment 28, 28a, etc. also includes an annular groove 84 in which is received a coil type garter spring 86 which is adapted when compressed to urge or bias the segment 28 to a withdrawn or radially outer position. In this connection, it will be understood that the term ring 26 or the like applies to the entire assembly of segments 28, 28a, 28b and 28c which form a collet or ring assembly. These units move inwardly together during mold closing to clamp the casing skirt 60 and which move outwardly together during mold opening in response to the action of the spring 86. Each segment 28, 28a, 28b and 28c also include its own outwardly directed inclined cam surface 82, 82a, 82b and 82c which is adapted in use to engage the counterpart, radially inwardly directed circumferential tapered cam surface 80 on the cam ring 30.

FIG. 2 also shows that the cam ring 30 includes a lower, radially extending surface 92 which is spaced apart from the counterpart surface 94 on the mold bottom plate 96, on which other elements of the mold such as the core 22 and the segments 28 are supported. Referring again to FIG. 1, it is shown that the bottom plate 96 also includes a plurality of circumferentially spaced apart, axially extending cavities 98, alternate cavities of which may contain guide pins 100 for extending into the recess 102 in the ring 30, and still others of which include compression coil springs 104 or the like which, when compressed, urge the cam ring 30 into the upward position, as will appear.

Referring again to the FIGS. 1 and 2, it will be noted that the means for actuating the cam ring 30 comprises a plurality of similar or identical actuating plungers 36, each including a head portion 106 of enlarged diameter with respect to its shank or column portion 37 which extends downwardly through the guide bores provided in the centering ring 32. A shoulder surface 108 limits movement of the plunger 36, while its upwardly directed end face 110 engages the stack 38 of individual Belleville (trademark) washer springs 112. The shoulder 108 on the top core 24 lifts the plunger 36 when the mold is opened.

From the foregoing, it will be noted that there are two sets of opposed compression springs at work in the mold, the stack 38 of compression springs between the plunger 36, and the column 40, and the return springs or the like 104 which are directed upwardly against the cam ring 30.

Bearing in mind that one principal object of the invention is to provide a molding apparatus which will, in a single step, position a casing for insert molding, form a cavity through which fluent molding material will pass, and at the same time form flash barriers at either end of the cavity, the manner in which these objects are achieved in the preferred form of mold will now be described.

First, assuming that the mold has been opened and that a casing 55 has been placed on the horizontal or radial surface 79 of the centering ring 32, the mold may be closed to the position shown in FIG. 2. Here, the molding cavity 50 may generally be seen, but the upper and lower mold cores 24, 22 are spaced axially apart. The inwardly directed surface 78 on the skirt portion 60 of the casing flange 58 lies in light contact with, or just spaced apart by a working clearance from the casing support surface 72 on the lower mold core 22. The individual segments 28 comprising the cam ring 26 are spaced radially outwardly a moderate distance from the core 22, so that the engagement surface 77 of the land 75 and the skirt 60 are initially spaced well apart. The cam ring 30 is positioned in a relatively axially withdrawn or uppermost position, such that its bottom surface 92 is spaced apart from the support surface 94 on the bottom mold plate 96. The plunger 36 is in a raised position with its shoulder 108 being spaced above the counterpart shoulder 109 on the upper mold core 24. The centering ring 32 holds the casing 55 in its desired radial position.

Figure 3:
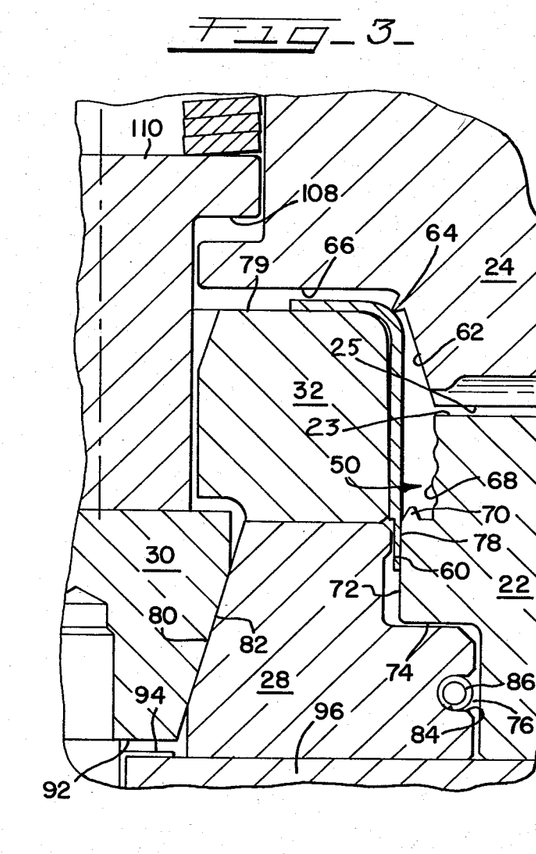
FIG. 3 is a vertical sectional view similar to that of FIG. 2, but showing the mold in the partially closed position.

In use, the mold is then partially closed as shown in FIG. 3. This operation includes the step of lowering the upper core 24 until the land 64 begins to engage the rounded surface of the casing 55 where the flanges 56, 58 meet each other. At this point, as shown in FIG. 3, the opposed surfaces 92, 94 on the cam ring and the bottom plate are still spaced apart but not as closely as in the position of FIG. 2. The segments 28 forming the clamping ring 26 have been moved radially inwardly by the action of the opposed cam surfaces 80, 82 compressing the garter spring 86. At this point, the surface 77 of the skirt engaging land 75 has just engaged or is just spaced apart from engaging the skirt 60, and the mold is not completely closed; injection of rubber has not yet begun.

Figure 4:
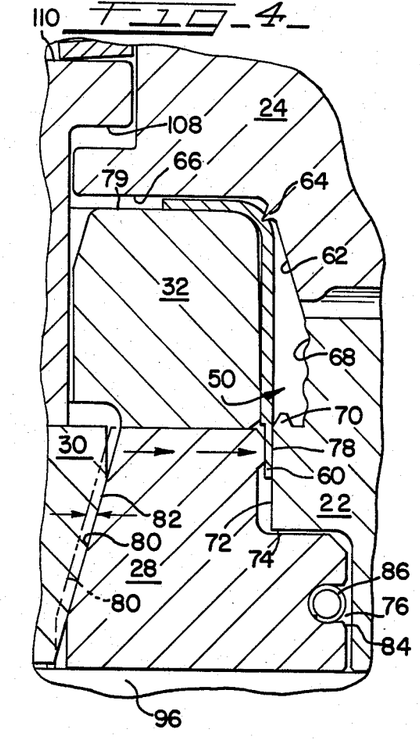
FIG. 4 is a view similar to that of FIGS. 2 and 3, showing the mold in the closed position and illustrating the cam action used to form the radial flash barrier.
Figure 5:
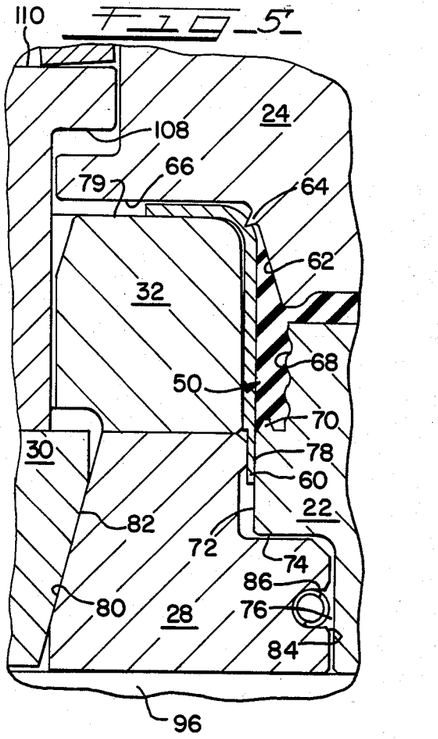
FIG. 5 is a view similar to that of FIGS. 1-4, and showing the finally formed elastomer in place and bonded to the casing, with such elastomer being confined by with axial and radial flash barriers.

FIG. 4 shows the mold as it is closed completely. At this point, the surfaces 92, 94 are in contact or are only slightly spaced apart from each other, and the segments 28 have moved radially inwardly as shown by the arrows. The dotted or phantom lines in FIG. 4 show the radial movement range of the segments 28 of the clamping ring 26. The plunger 36 has moved downwardly as the mold closes to exert the strong force through compression of the individual springs 112 in the stack 38 of Belleville (trademark) washers (see also FIG. 1). The arrows indicate that the land 75 exerts a strong radial compressive load on the skirt 60, urging the surface 78 on the casing flange 58 into fluid-tight engagement with the skirt support surface 72. This forms a flash barrier preventing escape of fluent rubber along the wall surface 72. As or just after complete mold closing has shown in FIG. 4, fluent rubber is forced through the sprues and passages 44, 46 and through the gate 48 and through the mold cavity 50. At this point, both the lower flash barrier formed by the radial compression of the skirt 60 acting through the land on the clamping ring segment and the sharpened land 64 on the upper mold core 24 have functioned effectively, and the high static pressures involved in forcing the rubber into the cavity and maintaining it there during initial curing may be achieved without causing flash or rubber leakage axially of the casing flange 58. After an initial cure of the rubber, customarily requiring thirty seconds to three minutes, the mold may be opened. This is accomplished by known means involving a removal of the upper core 24, causing its shoulders 109 to withdraw the plunger 36 upwardly as the mold opens, simultaneously removing the sharpened land 64 from its engagement with the casing 55. This permits the cam ring 30 to be free for upward movement. The cam ring moves upwardly under the influence of the springs 104, which withdraw to a desired open height such as to the position shown in FIG. 2. A lower or radially compressive flash barrier formed by the land 75 is also released, as the radially outward forces of the garter spring 86 come into play and urge the segments 28 of the clamping ring 26 radially outwardly. These segments then open up, as to the position shown in FIGS. 2 and 6, permitting ready removal of the part. When the upper mold core and its associated elements have been withdrawn vertically, the centering ring 32 may be moved axially upwardly, acting as a stripper plate to remove the finished seal product which has been released from its pinching or clamping engagement between the skirt support surface 72 and the ring segment 28. The finished part may be then removed and a new casing or stamping positioned over the stripper ring. The centering ring portion of the stripper plate portion in the cycle may be repeated.

An important feature of the invention is that the skirt portions 60 of the casing 55 is pinched without being permanently deformed in the mold.

In a preferred form of practicing the invention, the skirt 60 is, as shown, of reduced thickness with relation of the remainder of the casing flange 58. This renders it more readily compressible. Consequently, a good flash barrier action may be achieved and the skirt need not be deformed. Similarly, the width of the surface 77 on the land 75 prevents notching or grooving of the skirt surface in this embodiment. In many cases, it is desired to impart a gradual curl to the skirt 60 after the part is removed from the mold, and accordingly, it is not desired to notch or groove the casing in such a manner as to defeat the purpose of imparting a gradual curl to the skirt. Consequently, in this embodiment, the land 75 has a skirt engaging surface 77 of measurable width. In another embodiment, a groove (not shown) may be placed in the casing just above the point at which the land 75 engages the casing, the skirt 60 is thus defined as the part forming the outer margin on the flange 58. In this embodiment, the skirt 60 is still deformed inwardly to seal the flash, but the skirt is of the same thickness as the remainder of the flange 58. After the part is removed, the groove assists in locating the curl.

Referring now to another feature of the invention, the individual segment 28 making up the clamping ring 26 are shown as virtually encircling the mold core, which is a preferred form of the invention. These elements act as a collet, with individual elements spaced closely apart at their ends. The number of segments is shown as being four, but this may vary depending upon the preferences of the user. The casing clamping and barrier-forming characteristics of the clamping ring, in some respects, resemble those of a collet chuck, although they differ therefrom in important respects, particularly by the placement of the casing flange or skirt between the solid core 22 and the movable segments. Also, the arrangement is such that the units are not locked in place, but are biased to an opened position.

A single cam ring and clamping ring set has been shown for purposes of illustration, but it will be understood that it is possible to form spaced apart barriers using a series of clamping rings and cam actuating rings of the same or similar construction for additional portions of a mold cavity, for example. As pointed out above, one preferred form of the method is one wherein the skirt 60 of the casing flange 58 is of reduced thickness, and the flash barrier is formed by a land having a surface 77 which a substantial axial extent. In the alternative, as referred to above, a more sharpened land may be employed with a skirt engagement surface spaced axially away from the cavity and of the casing; this might be desired where the skirt 60 merely forms an extention of the flange 58 and is not of reduced thickness. Such a land can create a score or line of weakness in the skirt enabling it to be compressed inwardly with greater ease.

Where it is desired to create a bend or flange in the casing in a post-operation, this approach can be taken. According to the invention, it is only necessary that a sufficient portion of the casing skirt be surrounded and clamped by portions of the clamping ring which, within the elastic limits of the casing material, deform it radially against a core member having a portion of the mold cavity defining surfaces situated thereon to form an effective flash barrier. In the foregoing description, a clamping ring has acted inwardly; however, it is apparent that the stationary and movable parts could be reversed in that the flash barrier-creating forces could be applied radially outwardly, and this would be true whether the cavity were on the exterior of the casing or on the interior thereof, or in some circumstances, if there were a rubber body formed on both inner and outer surfaces of the casing.

The provision of the spring package, such as the stack 38 of springs 112 between the force supplying plunger 36 and the mold top plate provides proper control of the radial load applied to the casing skirt. Thus, the force is limited, not by the travel of the mold, but by the mechanical force able to be generated by spring compression. This helps in limiting the force so as to avoid damage to the metal parts, and at the same time insures relative uniformity of load as among the different mold cavities in the mold as a whole. In this connection, it will be appreciated that, in practice, it is not unusual to have as few as four to six cavities in one mold but as many as forty-eight to sixty-four cavities within a single mold. Consequently, the design is adaptable to both single cavity molds and multi-cavity molds.

The design achieves desired flexibility by placement of the casing land wherever desired in relation to the casing skirt; in other words, the amount of flash free or rubber-free casing may be varied merely by varying the length of the axial casing flange. Likewise, with the present design, if it is desired to move the land axially, this may be done by spacers or the like, or by changing of the core only, or both, without the need for reconstructing the entire mold.

It will thus be seen that the present invention provides novel multi-part mold assembly and method having a number of advantages and characteristics, including those herein specifically pointed out and others which are inherent in the invention.

A preferred embodiment of the invention having been shown by way of example, it is anticipated that other variations to the described form of apparatus and method may be made without depriving from the spirit of the invention or the scope of the appended claims.

I claim:

1. A multipart mold assembly for removably receiving a casing unit and positioning it so as to form, in combination with at least one of said mold parts, a cavity having the shape of an element to be formed in said mold and bonded to said casing, one of said mold parts having a surface defining at least a part of the shape of said cavity, and, joined to said cavity forming surface, a casing skirt support surface of circumferentially continuous, axially extending form, one of said mold parts having means thereon for positioning said casing so that one surface of said casing skirt lies along said support surface, separated therefrom by only a working clearance, means forming a part of said mold for forming a flash barrier along a part of said casing which is spaced apart from said casing skirt, a clamping ring formed from a plurality of individual clamping ring elements, with each of said elements having a land portion thereon for engaging the surface of said casing skirt opposite the surface thereof lying along said skirt support surface, a clamping ring actuator, and means for engaging said clamping ring actuator, with said clamping ring and said clamping ring actuator having mutually opposed cam surfaces engaging one another and arranged so that axial movement of said actuator causes radial movement of said clamping ring elements, said means for engaging said clamping ring actuator, being operable in response to mold closure, whereby mold closure causes said lands on clamping ring elements to engage said skirt on the surface thereof opposite the surface lying along said skirt support surface to deform said skirt within its elastic limit into fluid tight relation with said skirt support surface on said mold part, thereby forming a second flash barrier to prevent escape of fluent molding material from said cavity as said mold is closed, and whereby said flash barrier is formed on said casing skirt at said support surface and opposite the surface thereof engaged by said clamping ring land.

2. A multipart mold unit as defined in claim 1 wherein said clamping ring elements, upon mold closure, are adapted to move radially inwardly.

3. A multipart mold unit as defined in claim 1 wherein said casing skirt support surface lies along a radially outwardly directed surface of an inner mold core.

4. A multipart mold assembly as defined in claim 1 wherein said clamping ring elements are adapted to move radially inwardly upon mold closure and wherein said clamping ring actuator comprises a one piece cam ring lying generally radially outwardly of said clamping ring elements, with said camming surfaces lying on the radially outwardly and radially inwardly directed surfaces of said clamping ring elements and said cam ring respectively.

5. A multipart mold assembly as defined in claim 1 wherein said one of said mold parts having means for positioning said casing includes a centering ring disposed radially outwardly of said skirt support surface and being axially offset therefrom, said centering ring having a portion thereof which is engaged and positioned by said clamping ring elements.

6. A multipart mold assembly as defined in claim 1 wherein each of said clamping ring elements includes a circumferential groove lying on a radially inner portion thereof to form a clamping ring spring groove, and wherein said mold further includes a circumferentially extending garter spring disposed within said groove and acting to urge said clamping ring elements radially outwardly so that said lands on said clamping ring elements are urged into spaced apart relation to said skirt support portion so as to permit ready removal and insertion of said seal casing.

7. A multipart mold as defined in claim 1 wherein one of said mold parts is an axially removable top mold core, said core having a circumferentially continuous land thereon adapted to engage a surface of said casing to form said flash barrier on said spaced apart portion of said casing.

8. A multipart mold as defined in claim 1 which further includes a mold closing plate and wherein said clamping ring actuator comprises a continuous cam ring having said cam surfaces on its inner diameter, with said means for engaging said clamping ring actuator comprising a plurality of reciprocable plunger assemblies, said plunger assemblies each including a plunger unit with a first endface portion engaging said cam ring, an actuator spring and a second endface portion engaging a part of said actuator spring, said spring bias interposed between said second endface portions and said mold closing plate, whereby said clamping ring elements are strongly but resiliently urged into engagement with said casing skirt upon mold closure.

9. A multipart mold as defined in claim 1 wherein said one of said mold parts having said skirt support surface and said cavity forming surface is a lower, radially innermost mold core.

10. A multipart mold assembly comprising, in combination, a first, relatively fixed first mold core unit having a first exterior surface thereon defining at least a portion of a mold cavity having the shape of an article to be molded from a fluent, curable material, and a second exterior casing skirt support surface of axially extending, circumferentially continuous form having an edge portion meeting said cavity-forming surface at an axially outer edge thereof, second mold part of annular form having surfaces adapted to receive and position a rigid casing such that at least one surface of said casing lies in generally opposed relation to said cavity-defining surfaces on said first mold part, with said casing thereby forming another portion of said mold cavity, said second mold part being constructed and arranged to permit a skirt portion of said seal casing to extend axially beyond said second mold part, and to lie adjacent and closely spaced from said skirt support surface, a clamping ring made from plural individual ring segments each having at least one inwardly directed land surface closely spaced apart from and directed toward said casing support surface of said mold core, said clamping ring also having radially and axially inclined camming surfaces, a cam ring surrounding at least parts of said clamping ring and having camming surfaces in mutual engagement with said camming surfaces on said clamping ring, and actuator means adapted to engage said cam ring to move said cam ring axially during mold closing, and means normally biasing said clamping ring segments to a position spaced radially apart from said mold core, said mold parts being constructed and arranged such that, with a seal casing received in said mold and positioned by said second mold part, exerting a closing force on said mold parts secures said casing against axial movement by engaging a portion thereof, and whereby said closing force causes said cam ring to urge said land surfaces on said clamping segments radially into engagement with said casing to force said skirt against skirt support surface to provide a barrier to the escape of fluent material from said cavity between said casing and said support surface on said first mold part.

11. A mold assembly as defined in claim 10 which further includes another mold part having a sharpened land adapted, upon mold closing to engage a portion of said casing supported by said second mold part to form a second barrier to escape of fluent material from said cavity.

12. A seal mold unit comprising, in combination, a cam ring unit having tapered cam surfaces thereon defining, in part, a receiver for a collet assembly, a collet assembly comprised of plural individual collet elements received in said cam ring, with each of said collet elements having cooperating cam surfaces thereon for engagement with said cam ring surfaces, with each of said collet pieces having thereon a radially extending land adapted to engage a seal casing skirt, means associated with said cam ring for imparting axial movement thereto to impart a radial load to said collet pieces, a fixed mold core unit having circumferentially continuous cavity forming surfaces forming a part of its exterior and further including a casing skirt support surface in the form of a circumferential band having one of its edges lying along and joining a portion of one of said cavity forming surfaces, a second mold member having surfaces thereon adapted to support a portion of a seal casing and position it with respect to said cavity such that a portion of said casing lies opposite the cavity-forming surfaces on said mold core and said casing skirt lies along said skirt support surface, and a third mold member being axially movable with respect to said first mold member to permit loading and unloading of said casing units and having cooperating means thereon and on said second mold member for establishing a first flash barrier on said casing, with said cam ring and said collet pieces being arranged with respect to said mold core whereby with said casing in position and supported by said second mold piece, applying a closing force to said mold parts form said first flash barrier and also actuates said cam and urges said collet so as to create a fluid-tight pinching engagement between said land, said casing skirt, and said skirt support surface to form a second flash barrier to prevent flow of fluent elastomer from said cavity onto said casing skirt.

* * * * *

UNITED STATES PATENT AND TRADEMARK OFFICE
CERTIFICATE OF CORRECTION

PATENT NO. : 4,580,962

DATED : April 8, 1986

INVENTOR(S) : Norman C. Haas

It is certified that error appears in the above-identified patent and that said Letters Patent is hereby corrected as shown below:

Column 11, line 18, delete --fixed-- and insert --first--;
                        delete --core unit-- and insert --member--.

Column 12, line 3, insert --units-- after --casing--.

Signed and Sealed this

Sixth Day of September, 1988

Attest:

DONALD J. QUIGG

*Attesting Officer*  *Commissioner of Patents and Trademarks*